United States Patent

Higashi et al.

[11] Patent Number: 6,014,322
[45] Date of Patent: Jan. 11, 2000

[54] POWER SUPPLY UNIT, PARALLEL OPERATION CONTROL CIRCUIT APPLIED THERETO, AND PARALLEL OPERATION CONTROL METHOD

[75] Inventors: Shinya Higashi; Yukio Ikarashi, both of Tokyo, Japan

[73] Assignee: Kabushiki Kaisha Toshiba, Kawasaki, Japan

[21] Appl. No.: 09/105,169

[22] Filed: Jun. 26, 1998

[30] Foreign Application Priority Data

Aug. 14, 1997 [JP] Japan .................................. 9-219443

[51] Int. Cl.[7] .................................................. H02M 7/00
[52] U.S. Cl. .................................... 363/65; 363/67; 363/71
[58] Field of Search .................................. 363/65, 67, 69, 363/70, 71, 74, 79, 80

[56] References Cited

U.S. PATENT DOCUMENTS

5,675,480   10/1997   Stanford ................................. 363/21

Primary Examiner—Y. J. Han
Attorney, Agent, or Firm—Finnegan, Henderson, Farabow, Garrett & Dunner, L.L.P.

[57] ABSTRACT

An anode voltage of a diode for reverse current prevention provided in each power supply module is output to a current balance control terminal via a resistor. The current balance control terminals of the respective power supply modules are mutually connected, and an average level of the anode voltages in the reverse current prevention diodes of the respective power supply modules is applied to the current balance control terminals as a reference voltage level. By executing the switching control for the power MOSFET in each power supply module so as to make the anode voltage of the reverse current prevention diode in each power supply module equal to the reference voltage, the output current values of the respective power supply modules are set to be equal.

26 Claims, 6 Drawing Sheets

POWER SUPPLY UNIT, PARALLEL OPERATION CONTROL CIRCUIT APPLIED THERETO, AND PARALLEL OPERATION CONTROL METHOD

BACKGROUND OF THE INVENTION

The present invention relates to a power supply unit for use in a computer system such as a server computer, a parallel operation control circuit applied to the power supply unit and a parallel operation control method, and more particularly to a power supply unit having a plurality of parallel connected power supply modules and driving the load in accordance with the parallel output from the power supply modules, a parallel operation control circuit applied to the power supply unit and a parallel operation control method.

Some power supply units used in a computer system such as a server computer employ a high reliability power supply system using a redundancy system. As such power supply units employing the high reliability power supply system, those constituted to operate a plurality of power supply modules in parallel are known.

As for the parallel operation, the voltage control system has been well applied. The current balance control system uniformly keeps the output voltages of a plurality of parallel connected power supply modules. In a case where any one of the plural power modules breaks down, if it is removed, the same voltage control can be executed with the remaining power supply modules.

In the power supply unit employing the voltage control system, a circuit for monitoring the output voltages value needs to be provided for each of the power supply modules. Therefore, a transformer for monitoring the voltage is provided at the secondary side of a transformer for voltage transformation, and the output voltage value is detected by the transformer.

In this structure including the transformer for monitoring the voltage, however, the circuit configuration of each power supply module is complicated and enlarged, and as a result, the power supply unit is increased in size and the increase of the manufacturing cost is caused.

In addition, the latest power supply unit is required to support a function of swapping an arbitrary power supply module while keeping the power supply to the computer system such as a server computer, i.e. a function of the in-service swap (also called the hot swap), and for this reason, the structure of the power supply unit is inclined to be more complicated.

BRIEF SUMMARY OF THE INVENTION

Accordingly, it is an object of the present invention to provide a power supply unit which can realize the voltage control and the in-service swap in a simple structure without providing a transformer for voltage monitor or the like, and a parallel operation control circuit of the power supply unit.

According to one aspect of the present invention, there is provided a power supply unit having a plurality of parallel connected power supply modules, for driving a load by parallel outputs of the power supply modules, each of the plurality of power supply modules comprising: a power supply output terminal connected commonly to the plurality of power supply modules; a reverse current prevention element connected to the power supply output terminal; and a voltage control circuit for controlling an input terminal voltage level of the reverse current prevention element in its own power module such that input terminal voltage levels of the reverse current prevention elements in the plurality of power supply modules are equal.

According to another aspect of the present invention, there is provided a power supply unit having a plurality of parallel connected power supply modules, for driving a load by parallel outputs from the power supply modules, each of the plurality of power supply modules comprising: a power supply output terminal connected commonly to the plurality of power supply modules; a voltage converter including a switching element; a reverse current prevention element connected between the voltage converter and the power supply output terminal; a voltage deriving terminal for commonly connecting an input terminal of the reverse current prevention element in its own power supply module with input terminals of reverse current prevention elements in the other power supply modules; and a voltage control circuit for controlling an input terminal voltage level of the reverse current prevention element in its own power module such that input terminal voltage levels of the reverse current prevention elements in the plurality of power supply modules are equal, the voltage balance control circuit including a comparator circuit for inputting a voltage level of the voltage deriving terminal as a reference voltage, comparing the reference voltage with the input terminal voltage level of the reverse current prevention element in its own power supply module and outputting an error between the voltage levels, and the voltage control circuit controlling the switching element in accordance with the error.

According to another aspect of the present invention, there is provided a parallel operation control circuit, used in a power supply unit having a plurality of parallel connected power supply modules and driving a load by parallel outputs from the power supply modules, for controlling the parallel operation of the plurality of power supply modules, the circuit comprising: a plurality of reverse current prevention elements provided respectively at power supply output terminals of the plurality of power supply modules; and a voltage control circuit for controlling an input terminal voltage level of the reverse current prevention element in its own power module such that input terminal voltage levels of the reverse current prevention elements in the plurality of power supply modules are equal, the voltage control circuit comparing an average level of the input terminal voltage levels in the reverse current prevention elements in the plurality of power supply modules with the input terminal voltage level of the reverse current prevention element in each of the power supply modules, and controlling the input terminal voltage level of the reverse current prevention element in each of the power supply modules in accordance with an error of the voltage levels.

According to another aspect of the present invention, there is provided a parallel operation control method for use in a power supply unit including a plurality of power supply modules connected in parallel via power supply output terminals and driving a load by parallel outputs of the power supply modules, the method comprising the steps of: connecting reverse current prevention elements to the plurality of power supply output terminals, respectively; and controlling an input terminal voltage level of the reverse current prevention element in its own power supply module such that the input terminal voltage levels of the reverse current prevention elements in the plurality of power supply modules are equal, in each of the plurality of power supply modules.

According to another aspect of the present invention, there is provided a parallel operation control method for use in a power supply unit including a plurality of power supply modules connected in parallel via power supply output terminals and driving a load by parallel outputs of the power supply modules, the method comprising the steps of: providing a voltage converter having a switching element in each of the plurality of power supply modules; connecting a reverse current prevention element between the voltage converter and the power supply output terminal, in each of the plurality of power supply modules; connecting commonly the input terminal of the reverse current prevention element in its own power supply module to the input terminals of the reverse current prevention elements in the power supply modules other than its own power supply module via voltage deriving terminals, in each of the plurality of power supply modules; and providing in each of the plurality of power supply modules a comparator circuit for inputting a voltage level of the voltage deriving terminal as a reference voltage, comparing the reference voltage with a voltage level of the input terminal of the reverse current prevention element in its own power supply module and outputting an error of the voltage levels, so as to control the switching element in accordance with the error.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

First, the fundamental concept of the present invention will be simply described before the embodiments of the present invention are described in detail, from the viewpoint of making the present invention understandable.

That is, the power supply unit of the present invention is constituted on the basis of the concept that if input terminal voltage levels of reverse current preventing elements such as diodes and power MOSFETs provided at respective power supply output terminals of the plural power supply modules to achieve the in-service swap function, are substantially equal, the output voltage values of the power supply modules should be also equal. The voltage control circuit provided in each of the power supply modules compares the average level of the input terminal voltage levels of the reverse current preventing elements in the respective power supply modules with the input terminal voltage level of the reverse current preventing element in the corresponding power supply module, and controls the levels so as to make them equal to each other in accordance with the differential signal thereof, thereby controlling the output current of the corresponding power supply module. The output current values of the respective power supply modules are thereby set to be equal.

Preferred embodiments of the present invention will now be described with reference to the accompanying drawings.

First Embodiment

Figure 1:
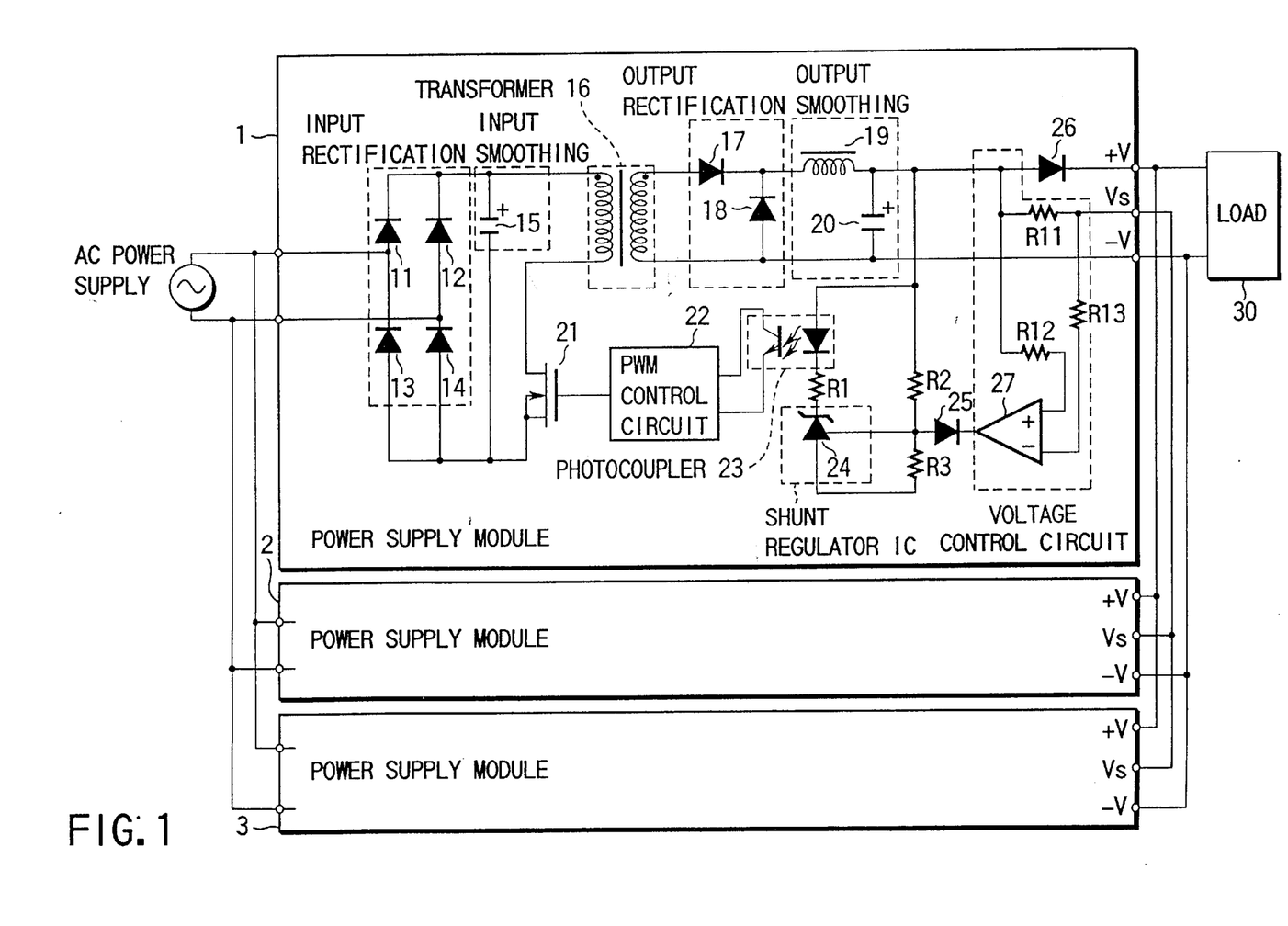
FIG. 1 is a circuit diagram showing a configuration of a power supply unit according to a first embodiment of the present invention.

FIG. 1 shows a power supply unit according to a first embodiment of the present invention. This power supply unit is a DC output power supply for generating a DC power supply required for operation of a server computer from an AC commercial power supply, and is constituted by a plurality of parallel connected power supply modules. Its structure will be described here by illustrating a case where three power supply modules (a power supply module 1, a power supply module 2, and a power supply module 3) are used.

As shown in the figure, the AC power supply input terminals of the three power supply modules 1, 2 and 3 are mutually connected in parallel, and their DC power supply output terminals are mutually connected in parallel. The respective power supply modules are constituted to be detachable from the power supply unit body, and can be detached and exchanged individually.

The power supply modules 1, 2 and 3 have the same circuit configuration and, therefore, the circuit configuration of the power supply module 1 will be described below as the typical one.

The power supply module 1 is a switching power supply for generating the stable DC power supply from the AC commercial power supply. As shown in the figure, diodes 11, 12, 13 and 14 for input rectification, a capacitor 15 for input smoothing, and a power MOSFET 21 are provided at the primary side of the transformer 16. In this primary side circuit, the AC voltage from the AC commercial power supply is rectified and smoothed by the diodes 11, 12, 13 and 14 and the capacitor 15, and changed to a pulse train by the switching operation of the power MOSFET 21. The switching operation of the power MOSFET 21 is controlled by a PWM (Pulse Width Modulation) control circuit 22. By this control, the duty factor of the pulse train at the primary side is controlled and the average voltage level at the primary side is adjusted. The voltage level of the pulse train at the primary side is transformed by the transformer 16 and then supplied to the secondary side.

At the secondary side of the transformer 16, diodes 17 and 18 for output rectification, an inductor 19 and a capacitor 20 for constituting a filter for output smoothing, and a diode 26 for prevention of reverse current, are provided. The voltage transformed by the transformer 16 is rectified and smoothed again by the diodes 17 and 18, the inductor 19 and the capacitor 20, and is output to the outside from power supply output terminals +V and −V as the DC voltage.

The power supply output terminals +V and −V of the power supply module 1 are respectively connected to power supply output terminals +V and −V of each of the power supply modules 2 and 3. The parallel outputs of the power supply modules 1, 2 and 3 are supplied an external load 30 of each electronic circuit or the like in the server computer as its drive power supply.

The diode 26 for reverse current prevention prevents an excess current from flowing from the power supply output terminals +V and −V when the power supply module 1 is detached, and it is thereby possible to detach the power supply module 1 while maintaining the power supply to the load 30.

At the secondary side of the transformer 16, an error amplifier constituted by a photocoupler 23, resistors R1, R2 and R3 and a shunt regulator IC24, and a voltage control circuit constituted by resistors R11, R12 and R13 and a differential amplifier 27, are further provided.

The error amplifier, which processes the switching operation of the power MOSFET 21 under the feedback control in accordance with the output voltage level at the secondary side, outputs an error between the output voltage level at the secondary side and a predetermined reference voltage level to the PWM control circuit 22. The operation of a DC/DC converter constituted by the power MOSFET 21, the transformer 16, the diodes 17 and 18, the inductor 19 and the capacitor 20 is controlled by this feedback loop, and the DC output voltage of a predetermined level can be thereby obtained stably.

The voltage control circuit is provided to equalize the output voltage values in the three power supply modules 1, 2 and 3. By comparing the anode voltage of the diode 26 for reverse current prevention provided in the power supply module 1 with an average level of the anode voltages of the diodes for reverse current prevention provided in the respective power supply modules 1, 2 and 3, the current balance control circuit detects an error from the comparison, and amplifies and outputs it. The error detected by the voltage control circuit is additionally input to the error amplifier via a diode 25 and added to the control of the feedback loop. By this operation, the switching operation of the power MOSFET 21 is controlled such that the anode voltage of the diode 26 for reverse current prevention provided in the power supply module 1 is equal to an average level of the anode voltages of the diodes for reverse current prevention provided in the respective power supply modules 1, 2 and 3.

An error between the anode voltage of the diode 26 for reverse current prevention provided in the power supply module 1 and an average level of the anode voltages of the diodes for reverse current prevention provided in the respective power modules 1, 2 and 3, is detected by using the voltage levels at both ends of the resistor R11. That is, the anode voltage of the diode 26 for reverse current prevention provided in the power supply module 1 is supplied to the positive input terminal of the differential amplifier 27 via the resistor R12, and also to a voltage control terminal Vs via the resistor R11. Since the voltage control terminals Vs of the respective modules 1, 2 and 3 are mutually connected, the average level of the anode voltages of the diodes for reverse current prevention provided in the respective power supply modules 1, 2 and 3 is applied as a reference voltage level to the voltage control terminals Vs.

PN-junction diodes having the same voltage-current characteristic are used as the diodes for reverse current prevention provided in the respective power supply modules 1, 2 and 3. Therefore, by setting the anode voltage levels of the diodes for reverse current prevention in the respective power supply modules 1, 2 and 3 so as to be equal, the output voltage values of the power supply modules 1, 2 and 3 can be set to be equal. As a result, the parallel operation of the power supply modules 1, 2 and 3 can be controlled by the voltage control in the respective power supply modules 1, 2 and 3.

Figure 6:
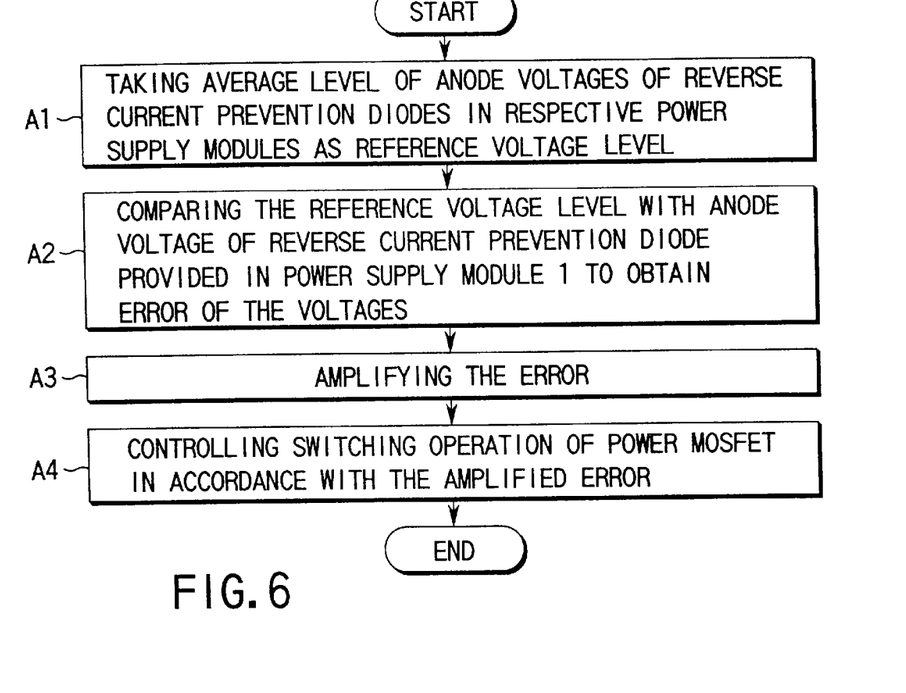
FIG. 6 is a flow chart showing the operation of the current balance control according to first and third embodiments of the present invention.

Next, the operation of the voltage control in the power supply module 1 will be described with reference to FIG. 6.

The average level of the anode voltages of the diodes 26 for reverse current prevention in the respective power supply modules 1, 2 and 3 is taken into the power supply module 1 through the voltage control terminal Vs as a reference voltage level (step A1).

The reference voltage level is compared with the anode voltage of the diode 26 for reverse current prevention in the power supply module 1 by the differential amplifier 27 to obtain its error (step A2).

The error is amplified by the error amplifier (step A3).

On the basis of the amplified error, the switching operation of the power MOSFET 21 is controlled by the PWM control circuit 22 such that the anode voltage of the diode 26 for reverse current prevention in the power supply module 1 follows the reference voltage (i.e. such that the error is corrected) (step A4).

With the series of operations, the anode voltage of the diode 26 for reverse current prevention in the power supply module 1 is made equal to the average level of the anode voltages of the diodes 26 for reverse current prevention in the respective power supply modules 1, 2 and 3 and, as a result, the output current values of the respective power supply modules are set to be equal.

As described above, according to the power supply unit of FIG. 1, by realizing the voltage control by use of the impedance elements for reverse current prevention provided at the output terminals of the respective power supply modules, both the voltage control and the in-service swap function can be realized in a simple structure without a transformer for monitoring the current and the like.

Second Embodiment

Figure 2:
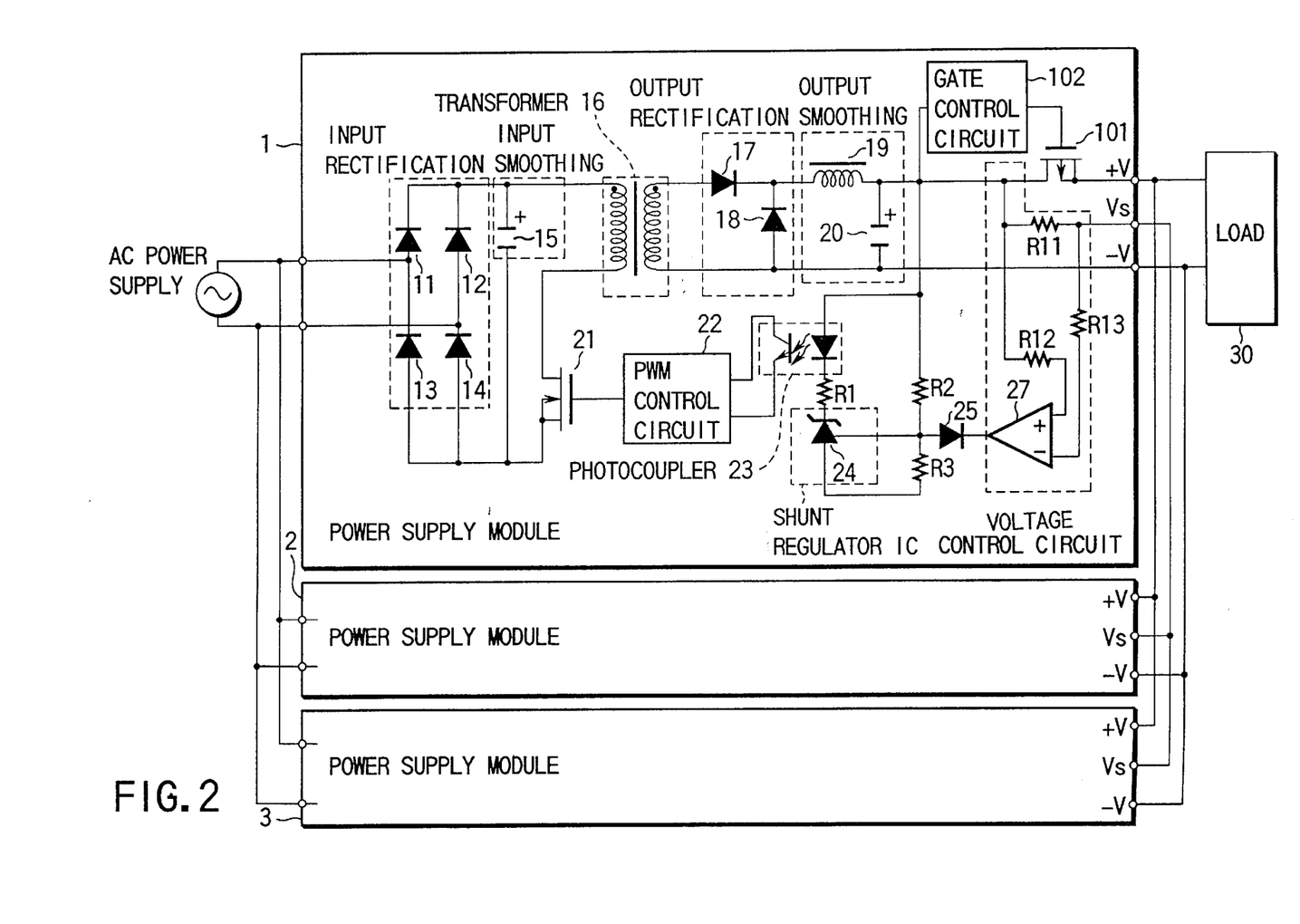
FIG. 2 is a circuit diagram showing a configuration of a power supply unit according to a second embodiment of the present invention.

FIG. 2 shows a power supply unit according to a second embodiment of the present invention.

This power supply unit is different from that of FIG. 1 with respect to the only structure of the reverse current prevention elements provided at the power supply output terminal side, and the other structure is quite the same as that of FIG. 1.

That is, as shown in the figure, in the power supply unit of the second embodiment, power MOSFETs 101 having the same characteristics are provided in the respective power supply modules 1, 2 and 3 as impedance elements for reverse current prevention elements. A current path between the source and the drain of each power MOSFET 101 is inserted into an input stage of the power supply output terminal +V, and is controlled to be turned on/off by a gate control circuit 102.

Figure 5:
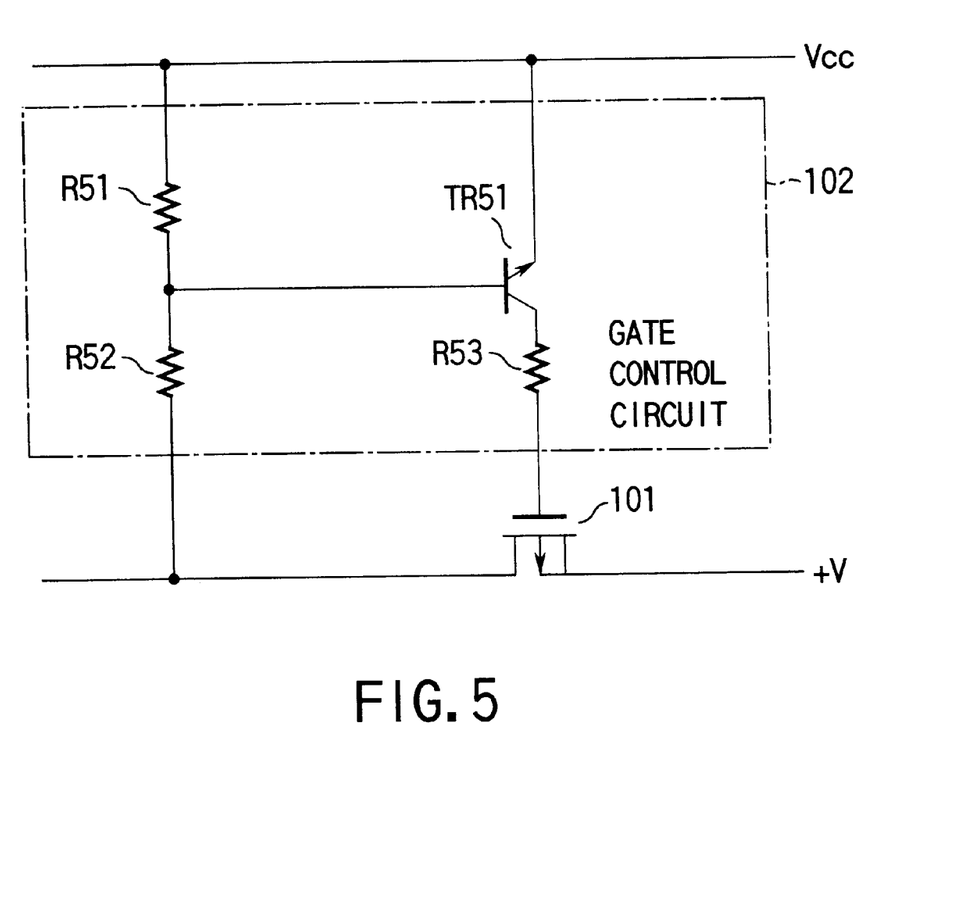
FIG. 5 is a circuit diagram showing a configuration of a gate control circuit used in the second and fourth embodiments.

The gate control circuit 102 can be realized with a simple circuit configuration using, e.g., a transistor TR51, resistors R51 to R53 and the like as shown in FIG. 5. The gate control circuit 102 can generate a voltage enough to control the power MOSFET 101 by using a voltage (e.g., voltage Vcc other than voltage +V) generated in the power supply module 1 or supplied from the outside into the power supply module 1.

The gate control circuit 102 generates the gate voltage of the power MOSFET 101 with reference to the output of the filter circuit for smoothing the output. The gate control circuit 102 turns on the power MOSFET 101 when the power supply module is in the in-service state, i.e. when the output of the filter circuit for smoothing the output exceeds a constant voltage level, and turns off the power MOSFET 101 when the operation of the power supply module is stopped, i.e. when the output of the filter circuit for smoothing the output is below the constant voltage level.

Therefore, when the operation of the power supply module 1 is stopped, the power supply module 1 can be electrically separated from the other power supply modules by the power MOSFET 101 in the off state. As a result, by detaching the power supply module 1 with its operation being stopped, it is possible to detach the power supply module 1 while the power supply to the load 30 is maintained by use of the other modules.

When the power supply module 1 is under the inservice condition, the power MOSFET 101 is kept in the on state. Therefore, the voltage control can be realized similarly to FIG. 1, by allowing the voltage control circuits in the respective power supply modules to control the voltage levels at the input stage of the power MOSFETs 101 so as to be mutually equal.

Figure 7:
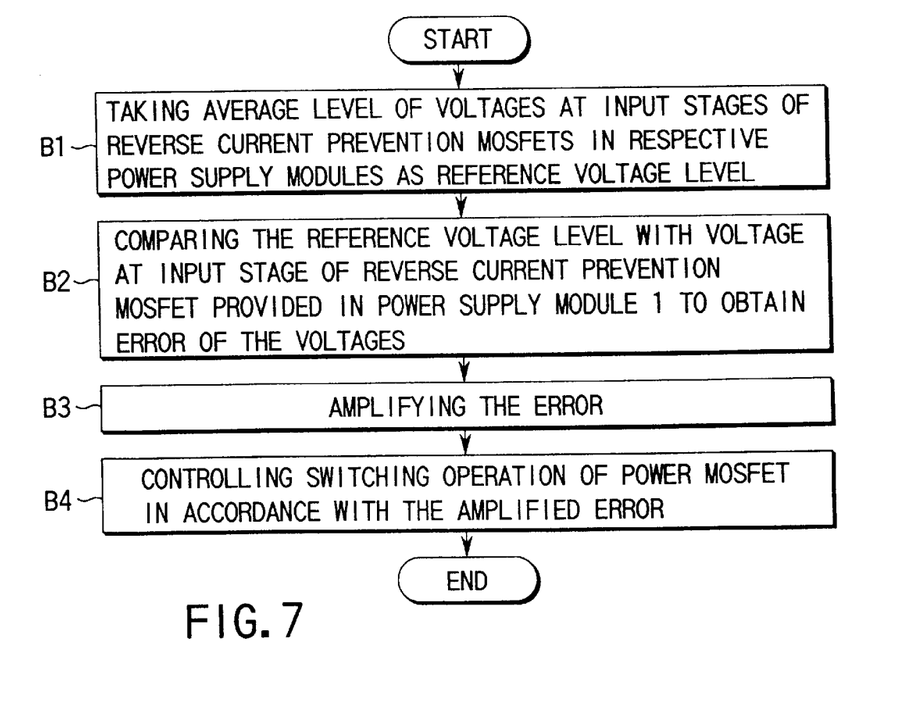
FIG. 7 is a flow chart showing the operation of the current balance control according to second and fourth embodiments of the present invention.

Next, the operation of the current balance control in the power supply module 1 will be described with reference to FIG. 7.

The average level of the voltages at the input stages of the MOSFETs 101 for reverse current prevention in the respective power supply modules 1, 2 and 3 is taken into the power supply module 1 through the voltage control terminal Vs as a reference voltage level (step B1).

The reference voltage level is compared with the voltage at the input stage of the MOSFET 101 for reverse current prevention in the power supply module 1 by the differential amplifier 27 to obtain its error (step B2).

The error is amplified by the error amplifier (step B3).

On the basis of the amplified error, the switching operation of the power MOSFET 21 is controlled by the PWM control circuit 22 such that the voltage at the input stage of the MOSFET 101 for reverse current prevention in the power supply module 1 follows the reference voltage (i.e. the error can be reduced) (step B4).

With the series of operations, the voltage at the input stage of the power MOSFET 101 for reverse current prevention in the power supply module 1 is made equal to the average level of the voltages at the input stages of the power MOSFETs 101 for reverse current prevention in the respective power supply modules 1, 2 and 3 and, as a result, the output voltage values of the respective power supply modules are set to be equal.

According to the second embodiment, since the power MOSFET has the impedance characteristic that its on resistance is increased as the temperature rises, the variation in the voltage caused by the variation in the temperature is smaller than that when the diode 26 is used as shown in FIG. 1, and the voltage control can be executed at higher accuracy.

Third Embodiment

Figure 3:
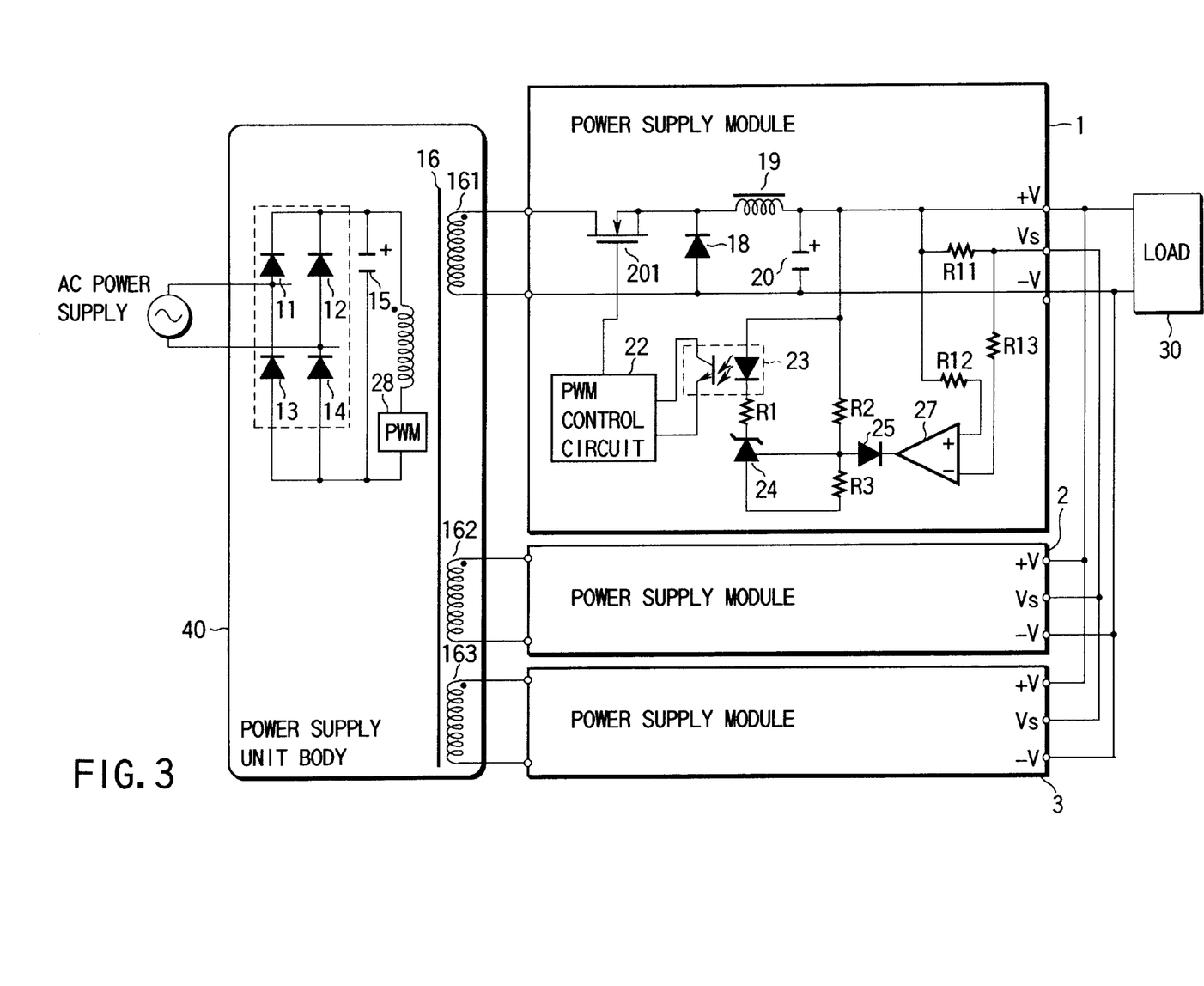
FIG. 3 is a circuit diagram showing a configuration of a power supply unit according to a third embodiment of the present invention.

FIG. 3 shows a power supply unit according to a third embodiment of the present invention.

The power supply unit is constituted so that the primary sides of the respective power supply modules of the first embodiment shown in FIG. 1 are combined to a common one and the common primary side is built in a power supply unit body 40. To the secondary side of the transformer 16 built in the power supply unit body 40, the power supply modules 1, 2 and 3 are connected via three secondary side coils 161, 162 and 163, respectively. The secondary side coils 161, 162 and 163 may be provided in the respective power supply modules 1, 2 and 3, or in the power supply body 40.

In the first and second embodiments, the power MOSFET used as the switching element is provided at the primary side. In the third embodiment, however, the power MOSFET 201 is moved to the secondary side in order to allow the output control to be executed in each of the power supply modules. By providing the power MOSFET 201 at the secondary side as shown in the figure, the diode 17, of the diodes 17 and 18 functioning as output rectification circuits, can be omitted.

The circuit configuration for voltage control in each of the power supply modules is quite the same as that shown in FIG. 1.

The operation of the voltage control is the same as that in the above-described first embodiment, and its explanation will be omitted.

According to the third embodiment, by combining the primary side circuits to a common one, the circuitry size of the entire power supply unit can be made smaller than that of the first and second embodiments.

Even in the third embodiment, similarly to the first and second embodiments, the structure of providing a voltage control output terminal Vsout and a voltage control input terminal Vsin can be applied to every power supply module.

Fourth Embodiment

Figure 4:
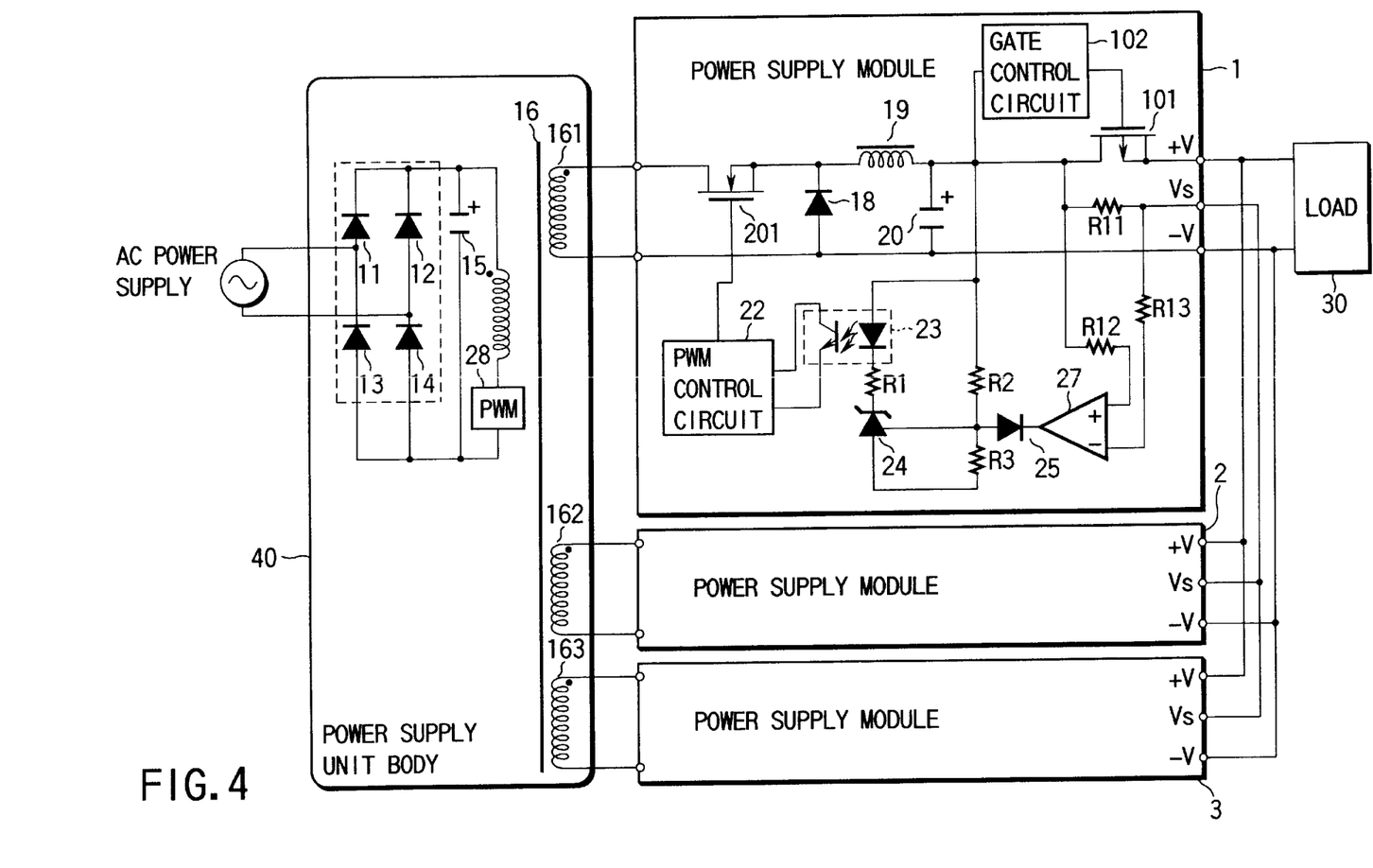
FIG. 4 is a circuit diagram showing a configuration of a power supply unit according to a fourth embodiment of the present invention.

FIG. 4 shows a power supply unit according to a fourth embodiment of the present invention.

This power supply unit is different from that of FIG. 3 with respect to the only structure of the reverse current prevention element provided at the power supply output terminal side, and the other structure is quite the same as that in FIG. 3.

That is, in the power supply unit of the fourth embodiment, power MOSFETs 101 having the same characteristics are provided in the power supply modules 1, 2 and 3, respectively, as impedance elements for reverse current prevention elements. A current path between the source and the drain of each power MOSFET 101 is inserted into the input state of the power supply output terminal +V, and is controlled to be turned on/off by the gate control circuit 102.

The operation of the voltage control is the same as that in the above-described second embodiment, and its explanation will be omitted.

In each of the embodiments described above, the impedance element for reverse current prevention is provided in the power supply module, but can be provided outside the power supply module.

As described above in detail, according to the present invention, when the voltage control is realized by using the impedance element for reverse current prevention provided at the output terminal of each power supply module, both the voltage control and the in-service swap function can be realized in a simple structure without providing a transformer for monitoring the voltage and the like.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A power supply unit having a plurality of parallel connected power supply modules, for driving a load by parallel outputs of the power supply modules, each of said plurality of power supply modules comprising:

a power supply output terminal connected commonly to said plurality of power supply modules;

a reverse current prevention element connected to said power supply output terminal; and a voltage control circuit for controlling an input terminal voltage level of the reverse current prevention element of a same power supply module such that input terminal voltage levels of the reverse current prevention elements in said plurality of power supply modules are equal.

2. A unit according to claim 1, wherein said voltage control circuit compares an average level of the input terminal voltage levels of the reverse current prevention elements in said plurality of power supply modules with the input terminal voltage level of the reverse current prevention element of the same power supply module, and controls the input terminal voltage level of the reverse current prevention element in its own power supply module so as to reduce an error of said voltage levels.

3. A unit according to claim 2, wherein said reverse current prevention element comprises a diode having an input terminal connected to a voltage converter and an output terminal connected to said power supply output terminal.

4. A unit according to claim 2, wherein said reverse current prevention element comprises a transistor, a current path of said transistor is connected between a voltage converter and said power supply output terminal, and a switch control signal is supplied to a control terminal of said transistor to turn on/off said transistor.

5. A unit according to claim 4, wherein said transistor is a power MOSFET.

6. A unit according to claim 2, wherein each of said power supply modules is constituted to be freely detached from a main body of said power supply unit.

7. A power supply unit having a plurality of parallel connected power supply modules, for driving a load by parallel outputs from the power supply modules, each of said plurality of power supply modules comprising:

a power supply output terminal connected commonly to said plurality of power supply modules;

a voltage converter including a switching element;

a reverse current prevention element connected between said voltage converter and said power supply output terminal;

a voltage deriving terminal for commonly connecting an input terminal of the reverse current prevention element of a same power supply module with input terminals of reverse current prevention elements in the other power supply modules; and a voltage control circuit for controlling an input terminal voltage level of the reverse current prevention element of the same power supply module such that input terminal voltage levels of the reverse current prevention elements in said plurality of power supply modules are equal, said voltage control circuit including a comparator circuit for inputting a voltage level of said voltage deriving terminal as a reference voltage, comparing the reference voltage with the input terminal voltage level of the reverse current prevention element of the same power supply module and outputting an error between said voltage levels, and said voltage control circuit controlling said switching element in accordance with the error.

8. A unit according to claim 7, wherein said reverse current prevention element comprises a diode having an input terminal connected to a voltage converter and an output terminal connected to said power supply output terminal.

9. A unit according to claim 7, wherein said reverse current prevention element comprises a transistor, a current path of said transistor is connected between said voltage converter and said power supply output terminal, and a switch control signal is supplied to a control terminal of said transistor to turn on/off said transistor.

10. A unit according to claim 9, wherein said transistor is a power MOSFET.

11. A unit according to claim 7, wherein each of said power supply modules is constituted to be freely detached from a main body of said power supply unit.

12. A parallel operation control circuit, used in a power supply unit having a plurality of parallel connected power supply modules and driving a load by parallel outputs from said power supply modules, for controlling the parallel operation of said plurality of power supply modules, said circuit comprising:

a plurality of reverse current prevention elements provided respectively at power supply output terminals of said plurality of power supply modules; and a voltage control circuit for controlling an input terminal voltage level of the reverse current prevention element of a same power supply module such that input terminal voltage levels of the reverse current prevention elements in said plurality of power supply modules are equal, said voltage control circuit comparing an average level of the input terminal voltage levels in the reverse current prevention elements in said plurality of power supply modules with the input terminal voltage level of the reverse current prevention element in each of said power supply modules, and controlling the input terminal voltage level of the reverse current prevention element in each of said power supply modules in accordance with an error of said voltage levels.

13. A parallel operation control method for use in a power supply unit including a plurality of power supply modules connected in parallel via power supply output terminals and driving a load by parallel outputs of said power supply modules, said method comprising the steps of:

connecting reverse current prevention elements to said plurality of power supply output terminals, respectively; and controlling an input terminal voltage level of the reverse current prevention element of a same power supply module such that the input terminal voltage levels of the reverse current prevention elements in said plurality of power supply modules are equal, in each of said plurality of power supply modules.

14. A method according to claim 13, wherein said controlling step includes a step of comparing an average level of input terminal voltage levels of reverse current prevention elements in said plurality of power supply modules with an input terminal voltage level of a reverse current prevention element of the same power supply module, in each of said plurality of power supply modules, and controlling the input terminal voltage level of the reverse current prevention element in its own power supply module so as to correct an error of the voltage levels.

15. A parallel operation control method for use in a power supply unit including a plurality of power supply modules connected in parallel via power supply output terminals and driving a load by parallel outputs of said power supply modules, said method comprising the steps of:

provide a voltage converter having a switching element in each of said plurality of power supply modules;

connecting a reverse current prevention element between said voltage converter and said power supply output terminal, in each of said plurality of power supply modules;

connecting commonly the input terminal of the reverse current prevention element of a same power supply module to the input terminals of the reverse current prevention elements in the power supply modules other than its own power supply module via voltage deriving terminals, in each of said plurality of power supply modules; and providing in each of said plurality of power supply modules a comparator circuit for inputting a voltage level of said voltage deriving terminal as a reference voltage, comparing the reference voltage with a voltage level of the input terminal of the reverse current prevention element in its own power supply module and outputting an error of the voltage levels, so as to control said switching element in accordance with the error.

16. A power supply unit having a plurality of parallel connected power supply modules, for driving a load by parallel outputs of the power supply modules, each of said plurality of power supply modules comprising:

a power supply output terminal connected commonly to said plurality of power supply modules;

a reverse current prevention element connected to said power supply output terminal;

a voltage deriving terminal, connected commonly to said plurality of power supply modules, for deriving input terminal voltage levels of the reverse current prevention elements of other ones of said plurality of power modules; and a voltage control circuit, which includes a resistor connected between an input terminal of the reverse current prevention element of a same power supply power module and said voltage deriving terminal, for controlling an input terminal voltage level of the reverse current prevention element of the same power supply power module to be equal to the derived voltage level of said voltage deriving terminal, in accordance with a voltage difference produced by said resistor.

17. A unit according to claim 7, wherein said voltage control circuit compares an average level of the input terminal voltage levels of the reverse current prevention elements in said plurality of power supply modules with the input terminal voltage level of the reverse current prevention element of the same power supply module, and controls the input terminal voltage level of the reverse current prevention element of the same power supply module so as to reduce an error of said voltage levels.

18. A power supply unit having a plurality of parallel connected power supply modules, for driving a load by parallel outputs of the power supply modules, each of said plurality of power supply modules comprising:

a power supply output terminal connected commonly to said plurality of power supply modules;

a reverse current prevention element connected to said power supply output terminal; and an analog voltage circuit for controlling an input terminal voltage level of the reverse current prevention element of a same power supply module such that input terminal voltage levels of the reverse current prevention elements in said plurality of power supply modules are equal.

19. A unit according to claim 18, wherein said analog voltage control circuit compares an average level of the input terminal voltage levels of the reverse current prevention elements in said plurality of power supply modules with the input terminal voltage level of the reverse current prevention element of the same power supply module, and controls the input terminal voltage level of the reverse current prevention element of the same power supply module so as to reduce an error of said voltage levels.

20. A unit according to claim 19, wherein said reverse current prevention element comprises a diode having an input terminal connected to a voltage converter and an output terminal connected to said power supply output terminal.

21. A unit according to claim 19, wherein said reverse current prevention element comprises a transistor, a current path of said transistor is connected between a voltage converter and said power supply output terminal, and a switch control signal is supplied to a control terminal of said transistor to turn on/off said transistor.

22. A unit according to claim 21, wherein said transistor is a power MOSFET.

23. A unit according to claim 19, wherein each of said power supply modules is constituted to be freely detached from a main body of said power supply unit.

24. A parallel operation control circuit, used in a power supply unit having a plurality of parallel connected power supply modules and driving a load by parallel outputs from said power supply modules, for controlling the parallel operation of said plurality of power supply modules, said circuit comprising:

a plurality of reverse current prevention elements provided respectively at power supply output terminals of said plurality of power supply modules; and an analog voltage control circuit for controlling an input terminal voltage level of the reverse current prevention element of a same power supply module such that input terminal voltage levels of the reverse current prevention elements in said plurality of power supply modules are equal, said analog control circuit comparing an average level of the input terminal voltage levels in the reverse current prevention elements in said plurality of power supply modules with the input terminal voltage level of the reverse current prevention element in each of said power supply modules, and controlling the input terminal voltage level of the reverse current prevention element in each of said power supply modules in accordance with an error of said voltage levels.

25. A parallel operation control method for use in a power supply unit including a plurality of power supply modules connected in parallel via power supply output terminals and driving a load by parallel outputs of said power supply modules, said method comprising the steps of:

connecting reverse current prevention elements to said plurality of power supply output terminals, respectively; and controlling an input terminal voltage level of the reverse current prevention element of a same power supply module with an analog control circuit, such that the input terminal voltage levels of the reverse current prevention elements in said plurality of power supply modules are equal, in each of said plurality of power supply modules.

26. A method according to claim 25, wherein said controlling step includes a step of comparing an average level of input terminal voltage levels of reverse current prevention elements in said plurality of power supply modules with an input terminal voltage level of a reverse current prevention element of a same power supply module, in each of said plurality of power supply modules, and controlling the input terminal voltage level of the reverse current prevention element of the same power supply module so as to correct an error of the voltage levels.

* * * * *

UNITED STATES PATENT AND TRADEMARK OFFICE
CERTIFICATE OF CORRECTION

PATENT NO.   : 6,014,322
DATED        : January 11, 2000
INVENTOR(S)  : Shinya Higashi et al.

It is certified that error appears in the above-identified patent and that said Letters Patent is hereby corrected as shown below:

<u>Column 9,</u>
Line 31, "in its own" should read -- of the same --.

<u>Column 11,</u>
Line 9, "in its own" should read -- of the same --.
Line 24, "its own" should read -- of a same --.
Line 55, "of the same" should read -- of a same --.

Signed and Sealed this

Twenty-second Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,014,322  
DATED : January 11, 2000  
INVENTOR(S) : Shinya Higashi et al.

Page 1 of 1

It is certified that error appears in the above-identified patent and that said Letters Patent is hereby corrected as shown below:

Column 9,  
Line 31, "in its own" should read -- of the same --.

Column 11,  
Line 9, "in its own" should read -- of the same --.  
Line 24, "its own" should read -- of a same --.  
Line 55, "of the same" should read -- of a same --.

Signed and Sealed this

Twenty-ninth Day of October, 2002

*Attest:*

*Attesting Officer*

JAMES E. ROGAN  
*Director of the United States Patent and Trademark Office*